US012729337B2

(12) United States Patent
Harnsberry et al.

(10) Patent No.: US 12,729,337 B2
(45) Date of Patent: Sep. 8, 2026

(54) ODOR MANAGEMENT FOR DISULFIDE SOLVENTS AND SURFACES CONTACTED THEREWITH

(71) Applicant: EXXONMOBIL TECHNOLOGY AND ENGINEERING COMPANY, Spring, TX (US)

(72) Inventors: Kevin A. Harnsberry, Beaumont, TX (US); P. Scott Northrop, Spring, TX (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 611 days.

(21) Appl. No.: 18/256,319

(22) PCT Filed: Oct. 8, 2021

(86) PCT No.: PCT/US2021/071795
§ 371 (c)(1),
(2) Date: Jun. 7, 2023

(87) PCT Pub. No.: WO2022/126043
PCT Pub. Date: Jun. 16, 2022

(65) Prior Publication Data

US 2024/0034923 A1 Feb. 1, 2024

Related U.S. Application Data

(60) Provisional application No. 63/123,012, filed on Dec. 9, 2020.

(51) Int. Cl.
*C09K 8/532* (2006.01)
*C09K 8/524* (2006.01)

(52) U.S. Cl.
CPC .............. *C09K 8/532* (2013.01); *C09K 8/524* (2013.01)

(58) Field of Classification Search
None
See application file for complete search history.

(56) References Cited

U.S. PATENT DOCUMENTS

| | | | | |
|---|---|---|---|---|
| 3,846,311 A * | 11/1974 | Sharp | C09K 8/532 | 299/5 |
| 4,239,630 A * | 12/1980 | Atkinson | C09K 8/532 | 299/5 |
| 4,509,989 A * | 4/1985 | Sumansky | C11D 3/0042 | 134/22.12 |
| 4,728,447 A | 3/1988 | Labat | | |
| 6,277,344 B1 | 8/2001 | Hei et al. | | |
| 2001/0005766 A1 | 6/2001 | Fremy | | |
| 2003/0157006 A1 | 8/2003 | Hei et al. | | |
| 2012/0220500 A1* | 8/2012 | Matza | C09K 8/52 | 208/236 |
| 2020/0002599 A1* | 1/2020 | Northrop | C09K 8/532 | |

FOREIGN PATENT DOCUMENTS

WO 2020005524 A1 1/2020

OTHER PUBLICATIONS

Written Opinion and International Search report from parent application PCT/US2021/071795 mailed Apr. 19, 2022.
Mao Jincheng et al, "Optimization of effective sulfur solvents for sour gas reservoir", Journal of Natural Gas Science and Engineering, Elsevier, Amsterdam, NL, vol. 36, Oct. 23, 2016 (Oct. 23, 2016), p. 463-471.

* cited by examiner

*Primary Examiner* — Anthony J Zimmer
*Assistant Examiner* — Zachary John Baum
(74) *Attorney, Agent, or Firm* — Vorys, Sater, Seymour and Pease LLP

(57) ABSTRACT

Disulfide solvents may be particularly effective for dissolving deposits comprising elemental sulfur, but the extreme odor of these solvent may make their use rather problematic. Solvent blends comprising at least one disulfide solvent, amine solvent, ketone solvent, and ester solvent may afford a less obnoxious odor and not appreciably compromise the sulfur dissolution capabilities. Surfaces contacted with such solvent blends or at least partially spent variants thereof may exhibit excessive odor due to loss of one or more of the amine, ketone, or ester solvents. Excessive odor resulting from a solvent residue upon a surface may be alleviated by contacting the surface with at least one oxidant. Odor balance may also be restored to at least partially spent solvent blends by introducing additional ester solvent, which may convert a biphasic mixture into an emulsion comprising the disulfide solvent.

11 Claims, No Drawings

ODOR MANAGEMENT FOR DISULFIDE SOLVENTS AND SURFACES CONTACTED THEREWITH

CROSS REFERENCE TO RELATED APPLICATION

This application claims the priority benefit of U.S. Provisional Patent Application No. 63/123,012 filed Dec. 9, 2020, entitled ODOR MANAGEMENT FOR DISULFIDE SOLVENTS AND SURFACES CONTACTED THEREWITH.

FIELD

The present disclosure relates to dissolution of elemental sulfur with disulfide solvents.

BACKGROUND

Elemental sulfur deposition may occur in conjunction with various activities associated with production of a hydrocarbon resource from a subterranean formation, particularly in sour gas reservoirs and in subterranean formations containing extensive sulfur-containing organic compounds. Excessive elemental sulfur deposition may impede production, or in even more serious scenarios, plug lines, tubing, valves or other equipment, thereby rendering a well facility inoperable.

Although some solvents are capable of dissolving large quantities of elemental sulfur, there are various challenges associated with their use. Carbon disulfide, for instance, is highly volatile, odorous, and extremely flammable. Disulfides present several advantages when used as solvents for dissolving elemental sulfur, but their excessive odor may likewise present significant operational difficulties. In fact, the extreme odor of disulfide solvents may require such extensive engineering controls to preclude discharge of even minute solvent quantities that it may become essentially impractical to use them effectively.

Diaryl disulfide is one example of a disulfide solvent having sufficiently low odor to facilitate its practical use. Unfortunately, commercial production of this chemical has been curtailed, and it is becoming scarce in bulk quantities. Dimethyl disulfide is an effective solvent for dissolving elemental sulfur, and would be a suitable replacement for diaryl disulfide, except for the operational challenges associated with its extreme odor.

U.S. Patent Application Publication 20200002599 describes solvent mixtures containing dimethyl disulfide that have significantly reduced odor. In particular, in addition to dimethyl disulfide, the solvent mixtures having a reduced odor profile contain an odorant fraction comprising an amine, a ketone, and ethyl lactate. Without being bound by theory or mechanism, the odorant fraction is believed to suppress olfactory receptors by providing competing strong smells and decrease the perceived odor associated with dimethyl disulfide.

SUMMARY

In some embodiments, the present disclosure provides methods for suppressing odor of a surface contacted with a solvent blend comprising a disulfide solvent. The methods comprise: contacting a surface with a solvent blend comprising at least one disulfide solvent, and one or more of: at least one amine solvent; at least one ketone solvent; and at least one ester solvent; forming a solvent residue upon the surface following removal of the solvent blend from the surface; wherein the solvent blend is odor imbalanced before contacting the surface to form the solvent residue, and/or the solvent residue becomes odor imbalanced after residing upon the surface for a period of time, the surface and the solvent residue collectively defining an odor imbalanced surface comprising one or more sulfur compounds; and contacting the odor imbalanced surface with an oxidant to convert the one or more sulfur compounds in a higher oxidation state and at least partially restore odor balance to the surface.

In some embodiments, the present disclosure provides methods for restoring a solvent blend comprising a disulfide solvent to an emulsion or similar homogeneous mixture. The methods comprise: contacting a deposit comprising elemental sulfur with a solvent blend comprising: at least one disulfide solvent; at least one amine solvent; at least one ketone solvent; and at least one ester solvent; wherein the solvent blend is initially odor balanced; dissolving at least a portion of the elemental sulfur in the solvent blend; hydrolyzing at least a portion of the at least one ester solvent under conditions that afford a biphasic mixture comprising a heavy phase and a light phase, the light phase containing at least a majority of the at least one disulfide solvent; wherein the biphasic mixture is odor imbalanced due to hydrolysis of at least a portion of the at least one ester solvent; and adding a sufficient quantity of the at least one ester solvent to convert the biphasic mixture into an emulsion or homogeneous mixture, in which the emulsion or homogeneous mixture is no longer odor imbalanced.

In some or other embodiments, the present disclosure provides methods for restoring a solvent blend to an emulsion or similar biphasic mixture. The methods comprise: providing a biphasic mixture comprising at least one disulfide solvent, water, and one or more of: at least one amine solvent; at least one ketone solvent; and at least one ester solvent; and combining a sufficient quantity of the at least one ester solvent with the biphasic mixture under conditions suitable to promote dewatering and conversion of the biphasic mixture into an emulsion or homogeneous mixture.

BRIEF DESCRIPTION OF THE DRAWINGS

Not applicable.

DETAILED DESCRIPTION

The present disclosure relates to sulfur dissolution using a disulfide solvent and, more particularly, methods for mitigating odor when using a solvent blend comprising a disulfide solvent to promote dissolution of sulfur deposits.

As discussed above, disulfide solvents may be particularly effective for dissolving sulfur deposits, such as in sour gas wells and in wellbore equipment associated therewith. Excessive odor of disulfide solvents, such as dimethyl disulfide, may make their use exceedingly problematic. Excessive odor of disulfide solvents may be mitigated by combining additional co-solvents that convey a suitable overall odor profile to the resulting solvent blend, while not substantially impacting with the sulfur dissolution capabilities relative to the disulfide solvent alone, and in some instances even enhancing the dissolution capabilities. In the disclosure herein, the solvent blend may be referred to as being "odor balanced" or a grammatical form thereof, when one or more disulfide solvents and additional co-solvents are present at a ratio sufficient to maintain a suitable overall odor profile. Competing strong smells are believed to render the odor of the solvent blend overall less objectionable to olfactory receptors.

Unfortunately, a solvent blend comprising a disulfide solvent and additional co-solvents may become "odor imbalanced" and no longer exhibit a suitable overall odor profile, particularly an overall odor profile in which the disulfide solvent odor again becomes overly prevalent. Odor profiles in the disclosure herein may be measured using ASTM E544-99 (Odor Intensity Referencing Scales). In one example, an ester co-solvent, such as ethyl lactate, may undergo hydrolysis and no longer be present in a sufficient quantity to suppress odor of a disulfide solvent. In another example, one or more so-solvents may undergo evaporation and again leave the remaining solvent blend in an odor imbalanced state. Surfaces that have interacted with a solvent blend containing a disulfide solvent may be particularly susceptible to the latter situation, wherein a solvent residue remaining on the surface after evaporation may contain excessive disulfide solvent and be odor imbalanced. An odor-imbalanced surface may result from contacting either an odor-imbalanced solvent blend or an initially odor-balanced solvent blend that later becomes odor-imbalanced. Regardless of how and where odor imbalance arises, the excessive odor may compromise one's ability to effectively use disulfide solvents for promoting sulfur dissolution.

The present disclosure provides various ways in which excessive odor arising from an odor-imbalanced solvent blend be addressed, particularly after an initially odor-balanced solvent blend has become odor imbalanced. Odor imbalance both in a solvent blend itself and upon a surface contacted by a solvent blend may be addressed through application of the disclosure herein. As an additional advantage, an initially biphasic mixture form of the solvent blends disclosed herein may be converted to an emulsion or similar homogeneous mixture through application of the disclosure herein.

Ester hydrolysis may generate an acid and an alcohol, as well as consume water from a solvent blend, thereby changing the solvent blend's compositional makeup. Surprisingly, the alcohols and carboxylic acids generated during this process do not appreciably impact the solubility of elemental sulfur in the solvent blend, even when significant quantities of water remain. Acid generation may be desirable in many instances, such as to dissolve a portion of the subterranean matrix in a carbonate formation to which the solvent blend is introduced. Dissolution of a portion of the subterranean matrix may stimulate increased production of a hydrocarbon resource. Carboxylic acids produced through ester hydrolysis may also promote dissolution of metal ions in some circumstances.

Although ester hydrolysis may be desirable in various instances, it may result in an initially odor-balanced solvent blend (i.e., a solvent blend containing one or more disulfide solvents, one or more amine solvents, one or more ketone solvents, and one or more ester solvents in a suitable ratio to provide an acceptable overall odor profile) becoming odor-imbalanced. In the presence of sufficient water, the solvent blends of the present disclosure may form a biphasic mixture comprising a light phase and a heavy phase, with the light phase containing the disulfide solvent. Such biphasic mixtures may remain persist even after ester hydrolysis and partial spending of the solvent blend takes place. Thus, in addition to excessive disulfide odor resulting from the solvent blend becoming odor imbalanced as a consequence of ester hydrolysis, the biphasic character of the resulting at least partially spent solvent blend may make handling considerably more difficult.

In the present disclosure, additional ester solvent may be added to an at least partially spent solvent blend that has become odor imbalanced in order to both restore odor balance and convert the biphasic mixture into an emulsion or like homogeneous mixture. Consumption of water through ester hydrolysis may aid in the conversion of the biphasic mixture into the emulsion or like homogeneous mixture. Addition of the ester solvent at low temperature may promote initial odor balancing, whereas ester hydrolysis and conversion of the biphasic mixture may occur at higher temperatures. Higher temperatures may also at least partially convert residual thiols into disulfides. The quantity of ester solvent introduced and suitable heating conditions may be chosen to facilitate water removal to form an emulsion or like homogeneous mixture, while still retaining sufficient ester solvent to promote odor balancing according to the disclosure herein. While particularly effective for converting an at least partially spent solvent blend into an emulsion or similar homogeneous mixture, addition of an ester solvent to a biphasic solvent blend that is initially odor balanced may be advantageous as well.

In a similar manner, ketone solvents may be added to a solvent blend or at least partially spent solvent blend that has become odor imbalanced, wherein one or more ketone solvents may restore odor balance. In addition, one or more ketone solvents may be added in an amount sufficient to promote a particular viscosity for facilitating production flow. In particular, additional ketone solvents may be added to decrease the viscosity of the solvent blends or at least partially spent solvent blends.

In the case of a solvent residue, the relatively low volatility of disulfide solvents may result in excessive disulfide solvent remaining upon a surface after contact with a solvent blend occurs, particularly following evaporation of the less volatile solvent blend components. Even trace quantities of residual disulfide solvent may convey an unacceptable odor to a surface when not balanced by additional co-solvents in a suitable ratio. Both odor-balanced and odor-imbalanced solvent blends (e.g., spent or partially spent solvent blends) may lead to this issue following contact with a surface. When a surface has an excessive disulfide solvent odor, the situation may not be easily remedied through co-solvent addition as provided above, since co-solvents may not be easily reintroduced to a solvent residue upon a surface in a correct ratio to suppress odor. That is, it may be difficult to establish and maintain a solvent residue in an odor-balanced state once excessive disulfide solvent, even in small amounts, has become deposited upon a surface. In the disclosure herein, an odor imbalanced solvent residue may be contacted with an oxidant to convert disulfides and other malodorous sulfur species (e.g., thiols) into considerably less volatile and less malodorous sulfoxides, sulfones, and/or sulfates. Mild oxidants may accomplish such a transformation to restore odor balance to a surface without significantly damaging or changing the performance or composition of the surface itself.

All numerical values within the detailed description and the claims herein are modified by "about" or "approximately" with respect to the indicated value, and take into account experimental error and variations that would be expected by a person having ordinary skill in the art. Unless otherwise indicated, ambient temperature (room temperature) is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

For the purposes of the present disclosure, the new numbering scheme for groups of the Periodic Table is used. In said numbering scheme, the groups (columns) are numbered sequentially from left to right from 1 through 18.

As used herein, the term "disulfide solvent" refers to any organic compound containing a sulfur-sulfur bond (i.e., R—S—S—R, wherein R is a hydrocarbyl group).

As used herein, the term "elemental sulfur" refers to any zero-valent polymorph of sulfur.

Solvent blends suitable for dissolving elemental sulfur while maintaining odor balance may comprise at least one disulfide solvent, and multiple co-solvents comprising at least one amine solvent, at least one ketone solvent, and at least one ester solvent. The multiple co-solvents may be referred to as an "odorant fraction" herein. As referenced above, the co-solvents, when suitably chosen and present in a sufficient ratio with respect to each other and with respect to the at least one disulfide solvent, may suppress odor of the at least one disulfide solvent and/or byproducts associated therewith (e.g., one or more thiols) and convey odor balance to the solvent blends. Further disclosure follows below regarding these co-solvents and suitable amounts thereof for maintaining sulfur dissolution capabilities and affording odor balance in a solvent blend.

The solvent blends utilized herein may exhibit decreased intensity or offensiveness and/or decreased perceived intensity or offensiveness, as evaluated relative to the intensity or offensiveness of the disulfide solvent alone, perceived or otherwise. As a non-limiting example, the solvent blends, when odor-balanced, may have a pleasant or more pleasant odor or perceived odor, and/or be less offensive/malodorous, as compared to the disulfide solvent alone. The co-solvents, in addition to conveying specific chemical and physical properties to the solvent blends, may impart contrasting and distinct odors to the solvent blends, thereby affording an acceptable odor balance (overall odor profile) to the solvent blends as a whole. Without being bound by theory or mechanism, the combination of the at least one disulfide solvent and the co-solvents may confuse and/or otherwise overwhelm the olfactory system organs of an individual who smells the solvent mixture, thereby causing an acceptable overall odor profile to be perceived by the individual. Such a phenomenon may be referred to herein as a "white smell effect" and/or "white smell odor." Situations in which the odor balance no longer provides an effective white smell effect may be addressed through application of the disclosure herein.

The odor intensity and/or decrease in the odor intensity of the solvent blends, including spent or partially spent variants thereof, and surfaces contacted therewith, may be measured and/or quantified in any suitable manner. As an example, the solvent blends may have a perceived intensity, relative to the odor of a disulfide solvent alone (i.e., a disulfide solvent contained in a given solvent blend), differing by at least about 1, by at least about 2, by at least about 3, by at least about 4, and/or by at least about 5 on an Odor Intensity Referencing Scale, as defined by ASTM E544-99. Such Odor Offensiveness Referencing Scales generally are subjective in nature and typically utilize panelists to rank odors on a scale of 0 to 10, with 0 indicating that the odor is not offensive/intense and 10 indicating that the odor is very offensive/intense.

The offensiveness and/or decrease of the offensiveness of the solvent blends, including spent or partially spent variants thereof, and surfaces contacted therewith, may similarly be measured and/or quantified in any suitable manner. As an example, the solvent blends may have a perceived offensiveness, relative to the offensiveness of the odor of a given disulfide solvent alone, differing by at least about 1, by at least about 2, by at least about 3, by at least about 4, and/or by at least about 5 on an Odor Offensiveness Referencing Scale.

The solvent blends disclosed herein, including spent or partially spent variants thereof, and solvent blends that otherwise have become odor-imbalanced, may further comprise dissolved elemental sulfur. The amount of elemental sulfur dissolved in the solvent blends may depend upon the quantity of elemental sulfur contacted with the solvent blends and the solubility limit of elemental sulfur in the solvent blends. As non-limiting examples, the solvent blends may feature a solubility limit of about 5 wt. % or above as measured relative to the solvent blend as a whole, or about 10 wt. % or above, or about 15 wt. % or above, or about 20 wt. % or above, or about 25 wt. % or above, or about 30 wt. % or above, or about 40 wt. % or above, or about 50 wt. % or above, or about 60 wt. % or above, or about 70 wt. % or above, or about 80 wt. % or above, or about 90 wt. % or above, or about 100 wt. % or above, or about 110 wt. % or above. The maximum solubility of elemental sulfur may be about 120 wt. %, but practical solubility values may be in a lower range due to viscosity issues and potential precipitation as the concentration nears the solubility limit. The foregoing solubility limits may be measured at standard temperature and pressure (1 atm and 25° C.). Preferably, the amount of dissolved elemental sulfur does not exceed the solubility limit in the solvent blends, either before or after becoming at least partially spent, to preclude unwanted deposition of elemental sulfur from the solvent blends in an undesired location.

In some instances, the solvent blends may have a maximum solubility of elemental sulfur that is less than that of the solubility in the at least one disulfide solvent alone. As examples, the maximum solubility of elemental sulfur may be about 10 wt. % or less, about 20 wt. % or less, about 30 wt. % or less, about 40 wt. % or less, about 50 wt. % or less, about 60 wt. % or less, about 70 wt. % or less, or about 80 wt. % or less of the maximum elemental sulfur solubility.

The solvent blends may comprise the one or more disulfide solvents in an amount of about 20 wt. % or greater, as measured relative to the solvent blend as a whole. More particular examples of the solvent blends may comprise about 30 wt. % or greater, or about 40 wt. % or greater of the at least one disulfide solvent, as measured relative to the solvent blend as a whole. Still more particular examples of the solvent blends may include those featuring about 20 wt. % to about 50 wt. % of the at least one disulfide solvent, or about 25 wt. % to about 45 wt. % of the at least one disulfide solvent, each as measured relative to the solvent blend as a whole. The foregoing amounts may be representative of the amount of the at least one disulfide solvent in as-prepared solvent blends, as well as in solvent blends that have become at least partially spent through loss or consumption of at least one co-solvent.

In particular embodiments, the at least one disulfide solvent may comprise or consist essentially of dimethyl disulfide (DMDS). The solvent blends may comprise at least about 20 wt. % DMDS, at least about 22 wt. % DMDS, at least about 24 wt. % DMDS, at least about 26 wt. % DMDS, at least about 28 wt. % DMDS, or at least about 30 wt. % DMDS in particular embodiments of the present disclosure. Additionally or alternatively, the solvent blends may comprise at most about 50 wt. % DMDS, at most about 45 wt. % DMDS, at most about 40 wt. % DMDS, at most about 35 wt. % DMDS, or at most about 30 wt. % DMDS.

In addition to at least one disulfide solvent in the amounts referenced above, the as-prepared solvent blends may comprise up to about 25 wt. % water, preferably up to about 20 wt. % water, as measured relative to the solvent blend as a whole. The amount of water present may be sufficient to partition the solvent blends into a biphasic mixture, or the amount of water may be low enough such that the solvent blends are emulsified or otherwise form a homogeneous mixture. The remaining balance of the solvent blends may collectively comprise the at least one amine solvent, the at least one ketone solvent, and the at least one ester solvent. Thus, in particular examples, the amount of the at least one amine solvent, the at least one ketone solvent, and the at least one ester solvent may collectively range from about 30 wt. % to about 80 wt. %, or about 40 wt. % to about 70 wt. % of the solvent blends. More specific disclosure regarding suitable examples of these solvents and particular amounts thereof to convey odor balance are provided hereinafter.

The solvent blends may comprise up to about 25 wt. % of the at least one amine solvent, as measured relative to the solvent blend as a whole. Suitable amines may include, but are not limited to, monoethanolamine, diethanolamine, triethanolamine, N-methyldiethanolamine, diisopropylamine, diglycolamine, 2-amino-2-methyl-1-propanol, piperazine, ethoxyethanol-tert-butylamine, and any combination thereof. In more particular examples, the solvent blends may comprise at least about 3 wt. %, at least about 4 wt. %, at least about 5 wt. %, at least about 6 wt. %, at least about 7 wt. %, at least about 8 wt. %, at least about 9 wt. %, at least about 10 wt. %, at least 15 wt. %, or at least about 20 wt. % of the at least one amine solvent, as measured relative to the solvent blend as a whole. The at least one amine solvent may be present in the solvent blends in a non-zero amount, preferably in an amount less than about 25 wt. % relative to the solvent blend as a whole. Without being bound by theory or mechanism, the at least one disulfide solvent may outgas hydrogen sulfide as a result of decomposition, and the at least one amine solvent may aid in sequestering the hydrogen sulfide through an acid-base interaction. The at least one amine solvent may also promote carbon dioxide absorption through a similar mechanism. Such absorption of acid gases may provide protection against corrosion. In addition, the at least one amine solvent may increase the reaction rate between the at least one disulfide solvent and the elemental sulfur undergoing dissolution therewith, as well as improve compatibility with EPDM seals, in a non-limiting example. The at least one amine solvent may also promote sequestration of $H_2S$, which may also decrease odor and corrosiveness of the solvent blends. The at least one ketone solvent, discussed below, may aid in masking the smell of the at least one amine solvent.

In more specific examples, the co-solvents of the solvent blends may include one or more amines that comprise or consist essentially of monoethanolamine (MEA), diethanolamine (DEA), or any combination thereof, preferably in a combined amount at least about 0.1 wt. %, at least about 0.2 wt. %, at least about 0.3 wt. %, at least about 0.4 wt. %, at least about 0.5 wt. %, at least about 0.6 wt. %, at least about 0.7 wt. %, at least about 0.8 wt. %, at least about 0.9 wt. %, or at least about 1.0 wt. %, as measured relative to the co-solvents as a whole. MEA and/or DEA may increase a rate of sulfur uptake within the solvent blends by serving as a catalyst for promoting the reaction of DMDS with elemental sulfur, afford corrosion protection for metals, such as carbon steel, contacting the solvent blends, and/or improve, or increase compatibility of the solvent blends with EPDM rubber. MEA and DEA may be especially effective in these roles at lower temperatures.

In some or other more specific examples, the co-solvents of the solvent blends may include one or more amines that comprise or consist essentially of triethanolamine (TEA), optionally in further combination with MEA and/or DEA. At least about 5 wt. % TEA or at least about 10 wt. % TEA, as measured relative to the solvent blend as a whole, may be present in particular examples. In still more specific examples, the co-solvents of the solvent blends may include one or more amines that comprise or consistent essentially of at least about 5 wt. % TEA, at least about 6 wt. % TEA, at least about 7 wt. % TEA, at least about 8 wt. % TEA, or at least about 9 wt. % TEA, as measured relative to the co-solvents as a whole.

In some or other more specific examples, the co-solvents of the solvent blends may include one or more amines that comprise or consist essentially of methyldiethanolamine (MDEA), optionally in further combination with MEA, DEA and/or TEA. At least about 5 wt. % MDEA or at least about 10 wt. % MDEA, as measured relative to the solvent blend as a whole, may be present in particular examples. In still more specific examples, the co-solvents of the solvent blends may include one or more amines that comprise or consistent essentially of at least about 5 wt. % MDEA, at least about 6 wt. % MDEA, at least about 7 wt. % MDEA, at least about 8 wt. % MDEA, or at least about 9 wt. % MDEA, as measured relative to the co-solvents as whole.

The solvent blends may comprise up to about 25 wt. % of the at least one ketone solvent, as measured relative to the solvent blend as a whole. Suitable ketones may include, but are not limited to, acetone, methyl ethyl ketone (2-butanone), dibutyl ketone, dipropyl ketone, diisobutyl ketone, or any combination thereof. In more particular examples, the solvent blends may comprise at least about 3 wt. %, at least about 4 wt. %, at least about 5 wt. %, at least about 6 wt. %, at least about 7 wt. %, at least about 8 wt. %, at least about 9 wt. %, at least about 10 wt. %, at least 15 wt. %, or at least about 20 wt. % of the at least one ketone solvent. The at least one ketone solvent may be present in the solvent blends in a non-zero amount, preferably in an amount less than about 25 wt. % relative to the solvent blend as a whole. Without being bound by theory or mechanism, the at least one ketone solvent may improve the contact angle between the at least one disulfide solvent and the elemental sulfur to aid in promoting dissolution, increase compatibility with EPDM seals, and decrease viscosity, in non-limiting examples. In addition, the strong odor of these ketone solvents may promote masking of the odor of the at least one disulfide solvent and/or the at least one amine solvent as well.

The solvent blends may comprise up to about 50 wt. % of the at least one ester solvent, as measured relative to the solvent blend as a whole. Suitable esters may include, but are not limited to, lactic acid (lactate) esters, glycolic acid (glycolate) esters, or any combination thereof. Preferably, the at least one ester solvent may comprise or consist essentially of ethyl lactate. In more particular examples, the solvent blends may comprise at least about 15 wt. %, at least about 20 wt. %, at least about 25 wt. %, at least about 30 wt. %, at least about 35 wt. %, or at least about 40 wt. % of the at least one ester solvent. The at least one ester solvent may be present in the solvent blends in a non-zero amount, preferably in an amount less than about 50 wt. % relative to the solvent blend as a whole. Without being bound by theory or mechanism, the at least one ester solvent may increase compatibility with EPDM seals, and serve as an acid precursor to promote dissolution of an acid-soluble material under appropriate conditions. In addition, the strong odor of ester solvents may aid in promoting masking of the odor of the at least one disulfide solvent and/or the additional co-solvents. Ethyl lactate, for example, may contribute a lemon-like scent to the solvent blends. Ethyl lactate and other ester solvents may also suppress coupling of thiols to reform disulfides, thereby contributing to odor suppression in that respect as well.

It is also within the scope of the present disclosure that the solvent blends may be formulated such that sulfur dissolution in the presence of water and retention of dissolved sulfur in the solvent blends may be realized. The foregoing may be realized while the solvent blends are in fluid contact with and/or while mixed with water for at least a threshold water contact time, such as at least about 1 hour, at least about 4 hours, at least about 8 hours, at least about 12 hours, at least about 16 hours, at least about 20 hours, at least about 24 hours, at least about 36 hours, or at least about 48 hours. The amount of water remaining after water contact occurs may be such that the solvent blends or at least partially spent solvent blends are in a biphasic mixture state after contacting occurs.

Solvent blends described above may be effective for dissolving elemental sulfur while maintaining odor balance, as discussed herein. Such solvent blends may become odor imbalanced through at least partial spending of one or more components. At least partially spent solvent blends may comprise the at least one disulfide solvent, optionally dissolved elemental sulfur, and quantities of one or more of the at least one amine solvent, the at least one ketone solvent, and/or the at least one ester solvent that are no longer suitable to maintain odor balance. Solvent blends that are initially odor balanced and unspent, initially odor balanced and at least partially spent, or at least partially spent and already odor imbalanced may leave a solvent residue upon a surface and exhibit an undesirable odor profile. The disclosure herein provides methods for mitigating the odor imbalance, either in the solvent blends themselves or at least partially spent variants thereof, or upon surfaces contacted with the solvent blends.

In some embodiments, an odor imbalanced surface may be mitigated and converted into a less odorous state by contacting the surface with a suitable oxidant. Such methods may comprise: contacting a surface with a solvent blend comprising at least one disulfide solvent, and one or more of: at least one amine solvent; at least one ketone solvent; and at least one ester solvent; and forming a solvent residue upon the surface following removal of the solvent blend from the surface. In forming the solvent residue, the solvent blend may be odor imbalanced before contacting the surface to form the solvent residue, and/or the solvent residue may become odor imbalanced after residing upon the surface for a period of time (e.g., due to evaporation of one or more components that provide odor balance), wherein the surface and the solvent residue collectively define an odor imbalanced surface comprising one or more sulfur compounds. The one or more sulfur compounds may comprise the disulfide solvent and/or one or more byproducts obtained therefrom (e.g., $H_2S$ or an organosulfur compound). Excessive odor in the odor imbalanced surface may be mitigated by contacting the odor imbalanced surface with an oxidant to convert the one or more sulfur compounds into a higher oxidation state and at least partially restore odor balance to the surface. Higher oxidation state sulfur compounds may be less volatile and have a less noxious odor than the sulfur compounds from which they are produced, as discussed hereinafter. Preferably, the surface may be contacted with the oxidant at room temperature or below (i.e., 25° C. or below) to decrease reactivity of the oxidant and limit potential damage to the surface. Contacting the surface with the oxidant may take place by spraying the oxidant on the surface in a non-limiting example.

Suitable oxidants for converting the one or more sulfur compounds into a higher oxidation state may be sufficiently mild to leave the surface having the solvent residue substantially undamaged or itself chemically modified, while converting the at least one disulfide solvent and/or one or more byproducts (e.g., thiols, $H_2S$ or other sulfur compounds) into less odorous compounds, such as sulfoxides, sulfones and/or sulfates. Suitable oxidants may include, but are not limited to sodium hypochlorite (bleach) dilute hydrogen peroxide (e.g., 3% hydrogen peroxide), a peracid, potassium peroxymonosulfate (OXONE), Pericosine A, and any combination thereof. Pericosine A is a natural product that may aid in remediating the odor of sulfur-containing compounds in skunk oil. All or a portion of the one or more sulfur compounds upon the surface may be converted into a higher oxidation state, depending upon the extent of conversion necessary to achieve sufficient odor reduction.

Suitable surfaces that may be contacted with a solvent blend or an at least partially spent variant thereof and undergo odor mitigation according to the disclosure herein are not considered to be particularly limited. In some embodiments, the surface may comprise a fabric or polymer surface, such as surfaces located within clothing, personal protective equipment, or any combination thereof.

In other embodiments, the surface contacted with the solvent blend or an at least partially spent variant thereof may comprise at least a portion of an oilfield assembly. As used herein, the term "oilfield assembly" may comprise any portion of a tool, equipment, pipeline, wellbore, tank, or the like that may be contacted with the solvent blends disclosed herein or an at least partially spent variant thereof in the course of performing an oilfield job. Oilfield jobs in which the solvent blends may be used include, for example, drilling, production, stimulation, remediation, or the like. In a particular example, a holding tank (frac tank) for housing the solvent blends before delivery downhole and/or for receiving an at least partially spent solvent blend from a downhole location, optionally containing dissolved sulfur, may contain a solvent residue that is undesirably odiferous. The resulting odor imbalanced surface may be contacted with an oxidant according to the disclosure herein to decrease the odor received therefrom.

Solvent blends of the present disclosure may be circulated downhole or be placed under conditions that result in conversion of at least a portion of the at least one ester solvent into the corresponding carboxylic acid and the corresponding alcohol. Ethyl lactate, for instance, in the presence of water and suitable temperatures may at least partially convert (hydrolyze) to lactic acid and ethanol, wherein the lactic acid may aid in stimulating a carbonate subterranean formation by dissolving a carbonate mineral within the subterranean matrix. Dissolution of the carbonate mineral may increase downhole permeability and improve production in a non-limiting example.

Upon hydrolysis of at least a portion of an ester solvent, a biphasic mixture may result, particularly in the presence of sufficient water, and in which the biphasic mixture is odor imbalanced due to consumption of at least a portion of the ester solvent, and the at least one disulfide solvent resides wholly or predominantly in a light (upper) phase comprising various organic compounds. In addition to having an unpleasant odor, this biphasic mixture may be difficult to handle during various operations. The present disclosure demonstrates that an emulsion may be obtained by adding a sufficient quantity of ester solvent to the biphasic mixture to restore odor balance thereto.

In some embodiments, excess ester solvent may be added to consume at least a portion of the water in the biphasic mixture to promote formation of an emulsion or similar homogeneous mixture. Thus, in addition to be being introduced in a sufficient amount to mitigate odor of the at least one disulfide solvent, the amount of the at least one ester solvent may be selected to promote at least partial dewatering of the biphasic mixture. Contact temperatures to promote at least partial dewatering of the biphasic mixture may reside within a range of about 200° F. or above or about 250° F. or above, particularly about 250° F. to about 300° F. in non-limiting examples. Dewatering of both a biphasic mixture of a solvent blend that is odor balanced or odor-imbalanced, particularly as a result of spending through ester hydrolysis, are contemplated in the disclosure herein.

Accordingly, some methods of the present disclosure may comprise: contacting a deposit comprising elemental sulfur with a solvent blend comprising: at least one disulfide solvent; at least one amine solvent; at least one ketone solvent; and at least one ester solvent; dissolving at least a portion of the elemental sulfur in the solvent blend; hydrolyzing at least a portion of the at least one ester solvent under conditions that afford a biphasic mixture comprising a heavy phase and a light phase, the light phase containing the at least one solvent capable of dissolving elemental sulfur and the biphasic mixture being odor imbalanced due to hydrolysis of at least a portion of the at least one ester solvent; and adding a sufficient quantity of the at least one ester solvent to convert the biphasic mixture into an emulsion or homogeneous mixture, in which the emulsion is no longer odor imbalanced.

In accomplishing the foregoing, the sufficient quantity of the at least one ester solvent, such as ethyl lactate, may be added directly to the biphasic mixture and/or contact a solvent residue left behind upon a surface that had interacted with the biphasic mixture. The surface may comprise at least a portion of an oilfield assembly, as discussed herein. Preferably, the sufficient quantity of the at least one ester solvent may be contacted with the biphasic mixture such that at least partial dewatering occurs, thereby promoting formation of the emulsion. Contacting to form the biphasic mixture may occur under heating conditions, such as a temperature of at least about 200° F. or at least about 250° F. in non-limiting embodiments.

Similarly in other examples, dewatering of a biphasic mixture through ester hydrolysis may convert a solvent blend that is either odor balanced or odor imbalanced into an emulsion or similar homogeneous mixture. Such methods may comprise: providing a biphasic mixture comprising at least one disulfide solvent, water, and one or more of: at least one amine solvent; at least one ketone solvent; and at least one ester solvent; and combining a sufficient quantity of the at least one ester solvent with the biphasic mixture under conditions suitable to promote dewatering and conversion of the biphasic mixture into an emulsion or homogeneous mixture.

Embodiments Disclosed Herein Include:

A. Methods for mitigating odor upon a surface. The methods comprise: contacting a surface with a solvent blend comprising at least one disulfide solvent, and one or more of: at least one amine solvent; at least one ketone solvent; and at least one ester solvent; forming a solvent residue upon the surface following removal of the solvent blend from the surface; wherein the solvent blend is odor imbalanced before contacting the surface to form the solvent residue, and/or the solvent residue becomes odor imbalanced after residing upon the surface for a period of time, the surface and the solvent residue collectively defining an odor imbalanced surface comprising one or more sulfur compounds; and contacting the odor imbalanced surface with an oxidant to convert the one or more sulfur compounds in a higher oxidation state and at least partially restore odor balance to the surface.

B. Methods for dewatering a biphasic mixture through addition of an ester solvent. The methods comprise: contacting a deposit comprising elemental sulfur with a solvent blend comprising: at least one disulfide solvent; at least one amine solvent; at least one ketone solvent; and at least one ester solvent; wherein the solvent blend is initially odor balanced; dissolving at least a portion of the elemental sulfur in the solvent blend; hydrolyzing at least a portion of the at least one ester solvent under conditions that afford a biphasic mixture comprising a heavy phase and a light phase, the light phase containing at least a majority of the at least one disulfide solvent; wherein the biphasic mixture is odor imbalanced due to hydrolysis of at least a portion of the at least one ester solvent; and adding a sufficient quantity of the at least one ester solvent to convert the biphasic mixture into an emulsion or homogeneous mixture, in which the emulsion or homogeneous mixture is no longer odor imbalanced.

C. Methods for dewatering a biphasic mixture through ester hydrolysis. The methods comprise: providing a biphasic mixture comprising at least one disulfide solvent, water, and one or more of: at least one amine solvent; at least one ketone solvent; and at least one ester solvent; and combining a sufficient quantity of the at least one ester solvent with the biphasic mixture under conditions suitable to promote dewatering and conversion of the biphasic mixture into an emulsion or homogeneous mixture.

Embodiments A-C may have one or more of the following additional elements in any combination:

Element 1: wherein the oxidant comprises an oxidant selected from the group consisting of aqueous hydrogen peroxide, aqueous sodium hypochlorite, a peracid, potassium peroxymonosulfate, Pericosine A, and any combination thereof.

Element 2: wherein the at least one disulfide solvent is less volatile than one or more of the at least one amine solvent, the at least one ketone solvent, or the at least one ester solvent.

Element 3: wherein the at least one disulfide solvent comprises dimethyl disulfide.

Element 4: wherein the at least one amine solvent comprises at least one amine selected from the group consisting of monoethanolamine, diethanolamine, triethanolamine, N-methyldiethanolamine, diisopropylamine, diglycolamine, 2-amino-2-methyl-1-propanol, piperazine, ethoxyethanol-tert-butylamine, and any combination thereof.

Element 5: wherein the at least one ester solvent comprises a lactate ester or a glycolate ester.

Element 6: wherein the lactate ester comprises ethyl lactate.

Element 7: wherein the at least one ketone solvent comprises diisobutyl ketone, methyl ethyl ketone, acetone, or any combination thereof.

Element 8: wherein the at least one disulfide solvent comprises about 20% or more of the solvent blend by weight.

Element 9: wherein the surface comprises at least a portion of a piece of clothing or at least a portion of a piece of personal protective equipment.

Element 10: wherein the surface comprises at least a portion of an oilfield assembly.

Element 11: wherein the solvent blend further comprises dissolved elemental sulfur.

Element 12: wherein the sufficient quantity of the at least one ester solvent is contacted with the biphasic mixture at a temperature above about 250° F.

Element 13: wherein the sufficient quantity of the at least one ester solvent is contacted with the biphasic mixture under conditions suitable to promote at least partial dewatering of the biphasic mixture.

Element 14: wherein the biphasic mixture is odor imbalanced before combining the at least one ester solvent.

Element 15: wherein the emulsion or homogeneous mixture is odor balanced after combining the at least one ester solvent.

Exemplary combinations applicable to A may include, but are not limited to, 1 and 2; 1 and 3; 1, 3 and 4; 1 and 3-5; 1, 3 and 5; 1, 4 and 5; 1 and 3-6; 1, 3, 5 and 6; 1, 4, 5 and 6; 1 and 4; 1 and 5; 1 and 7; 1 and 3-7; 1, 3, 5 and 7; 1, 4, 5 and 7; 1 and 8; 1 and 9; 1 and 10; 1 and 11; 3 and 4; 3-5; 3 and 5; 3-6; 3-7; 3, 4 and 7; 3 and 8; 3 and 9; 3 and 10; 3 and 11; 4 and 5; 4 and 6; 4-6; 4-7; 4 and 8; 4 and 9; 4 and 10; 4 and 11; 5 and 6; 5-7; 5 and 8; 5 and 9; 5 and 10; 5 and 11; 7 and 8; 7 and 9; 7 and 10; 7 and 11; 8 and 9; 8 and 10; 8 and 11; 9 and 10; 9 and 11; and 10 and 11.

Exemplary combinations applicable to B may include, but are not limited to, 3 and 4; 3-5; 3 and 5; 3-6; 3-7; 3, 4 and 7; 3 and 8; 3 and 9; 3 and 10; 3 and 11; 4 and 5; 4 and 6; 4-6; 4-7; 4 and 8; 4 and 9; 4 and 10; 4 and 11; 5 and 6; 5-7; 5 and 8; 5 and 9; 5 and 10; 5 and 11; 7 and 8; 7 and 9; 7 and 10; 7 and 11; 8 and 9; 8 and 10; 8 and 11; 9 and 10; 9 and 11; and 10 and 11, any of which may be in further combination with 12 or 13. Additional exemplary combinations applicable to B may include, but are not limited to, 3, and 12 or 13; 4, and 12 or 13; 5, and 12 or 13; 7, and 12 or 13; 8, and 12 or 13; 9, and 12 or 13; 10, and 12 or 13; and 11, and 12 or 13.

Exemplary combinations applicable to C may include, but are not limited to, 3 and 4; 3-5; 3 and 5; 3-6; 3-7; 3, 4 and 7; 3 and 8; 3 and 9; 3 and 10; 3 and 11; 4 and 5; 4 and 6; 4-6; 4-7; 4 and 8; 4 and 9; 4 and 10; 4 and 11; 5 and 6; 5-7; 5 and 8; 5 and 9; 5 and 10; 5 and 11; 7 and 8; 7 and 9; 7 and 10; 7 and 11; 8 and 9; 8 and 10; 8 and 11; 9 and 10; 9 and 11; and 10 and 11, any of which may be in further combination with 12, 13, 14 and/or 15. Additional exemplary combinations applicable to C may include, but are not limited to, 3, and 12, 13, 14 and/or 15; 4, and 12, 13, 14 and/or 15; 5, and 12, 13, 14 and/or 15; 7, and 12, 13, 14 and/or 15; 8, and 12, 13, 14 and/or 15; 9, and 12, 13, 14 and/or 15; 10, and 12, 13, 14 and/or 15; 11, and 12, 13, 14 and/or 15; 13 and 14; 13 and 15; and 14 and 15.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed, including the lower limit and upper limit. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A method comprising:

contacting a surface with a solvent blend comprising at least one disulfide solvent, and one or more of:

at least one amine solvent;

at least one ketone solvent; and at least one ester solvent;

forming a solvent residue upon the surface following removal of the solvent blend from the surface;

wherein the solvent blend is odor imbalanced before contacting the surface to form the solvent residue, and/or the solvent residue becomes odor imbalanced after residing upon the surface for a period of time, the surface and the solvent residue collectively defining an odor imbalanced surface comprising one or more sulfur compounds; and contacting the odor imbalanced surface with an oxidant to convert the one or more sulfur compounds in a higher oxidation state and at least partially restore odor balance to the surface.

2. The method of claim 1, wherein the oxidant comprises an oxidant selected from the group consisting of aqueous hydrogen peroxide, aqueous sodium hypochlorite, a peracid, potassium peroxymonosulfate, Pericosine A, and any combination thereof.

3. The method of claim 1, wherein the at least one disulfide solvent is less volatile than one or more of the at least one amine solvent, the at least one ketone solvent, or the at least one ester solvent.

4. The method of claim 1, wherein the at least one disulfide solvent comprises dimethyl disulfide.

5. The method of claim 1, wherein the at least one amine solvent comprises at least one amine selected from the group consisting of monoethanolamine, diethanolamine, triethanolamine, N-methyldiethanolamine, diisopropylamine, diglycolamine, 2-amino-2-methyl-1-propanol, piperazine, ethoxyethanol-tert-butylamine, and any combination thereof.

6. The method of claim 1, wherein the at least one ester solvent comprises a lactate ester or a glycolate ester.

7. The method of claim 1, wherein the at least one ketone solvent comprises diisobutyl ketone, methyl ethyl ketone, acetone, or any combination thereof.

8. The method of claim 1, wherein the at least one disulfide solvent comprises about 20% or more of the solvent blend by weight.

9. The method of claim 1, wherein the surface comprises at least a portion of a piece of clothing or at least a portion of a piece of personal protective equipment.

10. The method of claim 1, wherein the surface comprises at least a portion of an oilfield assembly.

11. The method of claim 1, wherein the solvent blend further comprises dissolved elemental sulfur.

* * * * *